(12) United States Patent
Syväluoma et al.

(10) Patent No.: US 11,005,584 B2
(45) Date of Patent: May 11, 2021

(54) CLOCK SYNCHRONIZATION IN A DEVICE

(71) Applicant: ABB Schweiz AG, Baden (CH)

(72) Inventors: Petri Syväluoma, Vaasa (FI); Juha Ylinen, Vaasa (FI); Mikko Lähdesmäki, Vaasa (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/831,024

(22) Filed: Mar. 26, 2020

(65) Prior Publication Data

US 2020/0228218 A1 Jul. 16, 2020

Related U.S. Application Data

(63) Continuation of application No. PCT/EP2018/076119, filed on Sep. 26, 2018.

(30) Foreign Application Priority Data

Sep. 26, 2017 (EP) .................................... 17193186

(51) Int. Cl.
*H04J 3/06* (2006.01)
(52) U.S. Cl.
CPC .................. *H04J 3/0641* (2013.01)
(58) Field of Classification Search
CPC .......... H04J 3/06; H04J 3/0635; H04J 3/0638; H04J 3/0641; H04J 3/0644; H04J 3/065; H04J 3/0655; H04J 3/0667; H04L 7/00; H04L 7/0016
See application file for complete search history.

(56) References Cited

U.S. PATENT DOCUMENTS

| 6,618,455 | B1 | 9/2003 | Maeda et al. | |
| 9,690,674 | B2* | 6/2017 | Cui | H04J 3/0641 |
| 10,666,372 | B2* | 5/2020 | Goel | H04J 3/0682 |
| 2013/0227008 | A1* | 8/2013 | Yang | H04J 3/0641 |
| | | | | 709/204 |
| 2016/0149692 | A1 | 5/2016 | Kim et al. | |

(Continued)

OTHER PUBLICATIONS

European Patent Office, International Preliminary Report on Patentability issued in corresponding Application No. PCT/EP2018/076119, dated Aug. 14, 2019, 12 pp.

(Continued)

*Primary Examiner* — Siu M Lee
(74) *Attorney, Agent, or Firm* — Taft Stettinius & Hollister LLP (57) ABSTRACT

To provide an indication of an accuracy level of a grandmaster clock, a solution using at least three different grandmaster types and grandmaster information maintained in a device is introduced. The three grandmaster types are a primary grandmaster, a secondary grandmaster and neither of them. The grandmaster information includes information on a primary grandmaster and information based on which one or more secondary grandmasters may be determined. After master-slave hierarchy negotiations, the grandmaster information and information on a master clock negotiated is used to determine whether the master clock negotiated for the device is the primary grandmaster, a secondary grandmaster setting a warning, or neither of them in which case an alarm is set.

17 Claims, 3 Drawing Sheets

(56) References Cited

U.S. PATENT DOCUMENTS

2017/0359139 A1* 12/2017 Butterworth ............ H04L 69/08

OTHER PUBLICATIONS

European Patent Office, International Search Report & Written Opinion issued in corresponding Application No. PCT/EP2018/076119, dated Dec. 10, 2018, 12 pp.
European Patent Office, Search Report issued in corresponding Application No. 17193186.8, completed Mar. 8, 2018, 2 pp.

* cited by examiner

000
CLOCK SYNCHRONIZATION IN A DEVICE

FIELD

The present invention relates to clock synchronization in a device, and especially synchronizing to an external clock.

BACKGROUND ART

The evolution of communication technology has enabled versatile communication possibilities and introduction of different services, including services requiring real-time performance. Especially if several devices in a network are providing the service with the real-time performance, there is a need to synchronize the devices within the network. The synchronization may be achieved by using a Precision Time protocol (PTP) providing accurate timing information from one device comprising a so-called grandmaster to clocks in other devices in the same timing domain, enabling their synchronization to a timing signal originating from the grandmaster, source of the timing signal. The grandmaster is the clock that is determined to be the best one during so-called master-slave hierarchy negotiations. Devices may be connected and disconnected to the timing domain, causing new master-slave hierarchy negotiations. This means that any of the clocks within the same domain may become a new grandmaster with a risk that the grandmaster clock accuracy decreases below accuracy required in a slave device. Nevertheless, the synchronization status of the device is considered as synchronized, since there is timing information available in the timing domain.

SUMMARY

An object of the present invention is to provide a mechanism to ensure that the device is better informed on an accuracy level of the synchronization. The object of the invention is achieved by a method, a computer program product and a device, which are characterized by what is stated in the independent claims. The preferred embodiments of the invention are disclosed in the dependent claims.

A general aspect of the invention uses at least three different grandmaster types and grandmaster information maintained in a device. The three grandmaster types are a primary grandmaster, a secondary grandmaster and neither of them. The grandmaster information comprise information on a primary grandmaster and information based on which one or more secondary grandmasters may be determined, a grandmaster being in a timing domain of the device an external clock to which the device may synchronize. After master-slave hierarchy negotiations, the grandmaster information and information on a master clock negotiated is used to determine whether the master clock negotiated is the primary grandmaster, a secondary grandmaster, or neither of them. That in turn indicates the accuracy level of the master clock negotiated.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any device in any system, any network or any timing domain, that is configured, or configurable to support principles of the precision time protocol system, the principles including master-slave clock synchronization hierarchy and best master clock negotiations. In the master-slave clock synchronization hierarchy one clock, or a device providing the clock, is the master and others are slaves that use the time information from the master to synchronize. In the best master clock negotiations data describing clocks is compared to determine which data describes the best clock. Usually the comparison is made between two clocks. A non-limiting example of such a network is an Ethernet-network connecting different devices.

Figure 1:
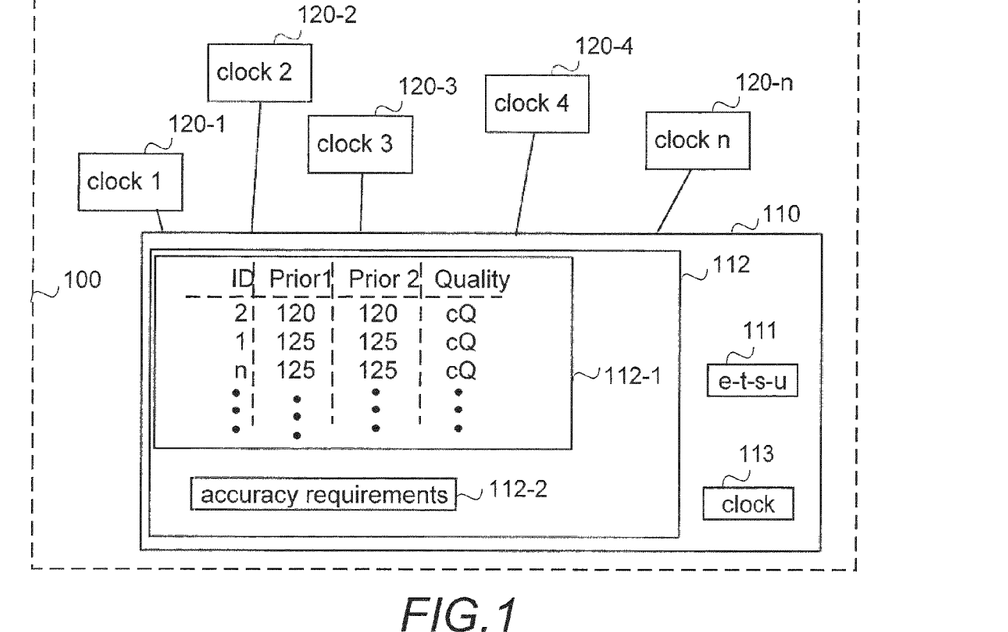
FIG. 1 shows a simplified a system with a block diagram of an exemplified device.

A highly general clock synchronization architecture of a system is illustrated in FIG. 1. FIG. 1 shows only some devices/clocks within a timing domain and some functional entities within a device, all being logical units whose implementation and/or number may differ from what is shown. The connections shown in FIG. 1 are logical connections; the actual physical connections may be different. It is apparent to a person skilled in the art that the systems also comprise other devices and functional entities.

In the example illustrated in FIG. 1, the clock synchronization architecture of the system 100 is illustrated in view of a device 110 belonging to a timing domain comprising other devices 120-1, 120-2, 120-3, 120-4, 120-n with corresponding clocks.

The device 110 may be any computing device, apparatus, node or a clock that can at least synchronize to a grandmaster, i.e. be a slave. Examples of such a device include network connected appliances in home and industrial environments. For example, in the industrial environment the device may be a controlling apparatus, frequency converter, AC/DC module, DC/AC module, programmable logic controller, switch, motion controller or motion drive, servo motor, soft starter, robots, and heavy equipment, etc., just to list only some examples. The device may also be configured to be a grandmaster if it has the most accurate clock 113 in the time domain. The device 110 is configured to support an enhanced time supervision providing information on an accuracy level of the synchronization. For that purpose the device comprises an enhanced time supervision unit (e-t-s-u) 111, and in its memory 112 grandmaster information 112-1 and accuracy values 112-2.

The grandmaster information 112-1 may be a list, as illustrated in the example of FIG. 1. However, it should be appreciated that any other form to store corresponding information may be used. The grandmaster information 112-1 comprises at least information on a primary grandmaster. Further, the grandmaster information 112-1 may comprise information on one or more secondary grandmasters, or information based on which one may determine whether a master clock is a secondary grandmaster. For the latter purpose, the accuracy values 112-2 may be sufficient. Each grandmaster in the grandmaster information 112-1 is associated at least with corresponding clock identifier (ID). If the grandmaster information 112-1 comprises also information on secondary grandmasters, each grandmaster is associated with information indicating whether it is the primary or a secondary grandmaster. Further, the grandmaster information 112-1 may comprise for each grandmaster in the grandmaster information 112-1 attribute values for attributes that may be used in the device master-slave hierarchy negotiations to determine the best clock. In the illustrated example of FIG. 1, the grandmaster information 112-1 is an ordered list in which the grandmasters are listed according to a best master order, starting from the primary grandmaster and then having the secondary grandmasters. In the illustrated example grandmaster having "2" as an identifier (ID), is the primary grandmaster, first secondary is "n" and second secondary is "1", etc., the order being revealed by their location in the list. However, instead of the ordered list any form of storing the information may be used, but then the identifier needs to be associated with some indication whether the grandmaster is the primary grandmaster or one of the secondary grandmasters. Further, in the illustrated example of FIG. 1, each identifier in the grandmaster information 112-1 (or grandmaster list) is associated with attribute values of some attributes that may be used to determine the best clock during negotiations. In the illustrated example, the attributes are Priority 1 (Prior 1), Priority 2 (Prior 2) and Quality.

An advantage having an ordered list and clock identifiers associated with one or more attribute values defining clock accuracy that it provides versatile possibilities to maintain a list (adaptive list) in an adaptive way, as will be described in more detail below. A further advantage is that it allows differentiation between different warnings, for example, if needed.

The accuracy requirements 112-2 include accuracy class required by an application for the timing. They may further comprise attribute value requirements for one or more attributes of the attributes that may be used to determine the best clock during negotiations. For example, the accuracy requirements 112-2 may include a requirement that a second and further secondary grandmasters must at least have the same attribute value for the Priority 1 than the first secondary grandmaster has.

Each or some of the clocks 120-1, 120-2, 120-3, 120-4, 120-n may also be configured to support the enhanced time supervision, and thereby configured to comprise the information described above, and the enhanced time supervision unit.

Further, it should be appreciated that the clocks may implement the enhanced time supervision in different ways, since, as is readily understood from the following, the process is device-specific.

Figure 2:
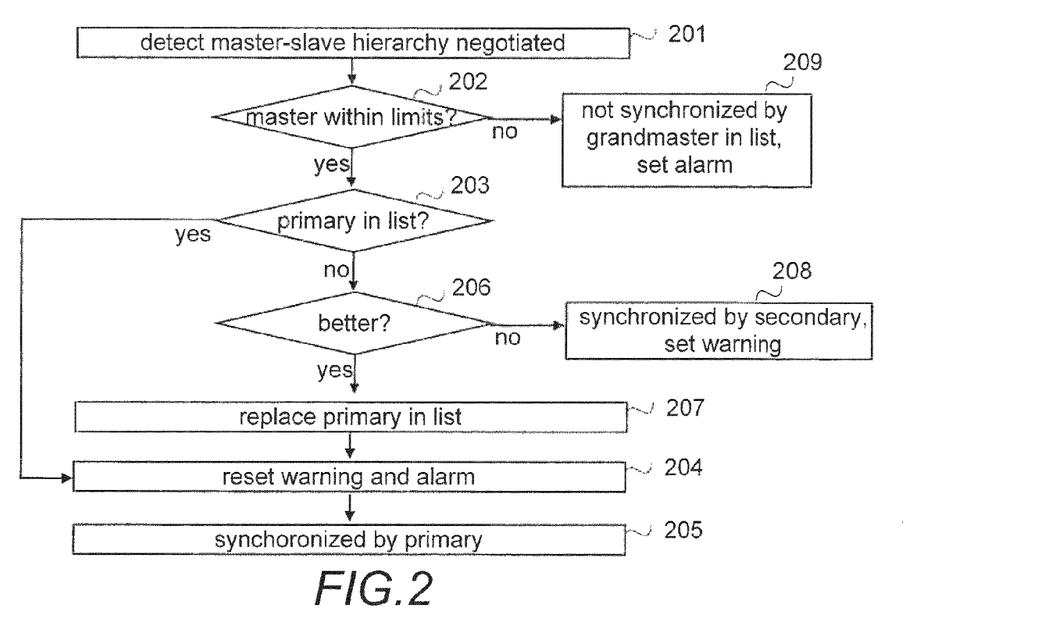
FIGS. 2 to 5 are flow charts illustrating different functionalities.

FIG. 2 illustrates an example of a functionality of the enhanced time supervision unit. In the illustrated example it is assumed that the grandmaster information is maintained in an adaptive way, but only information on the primary grandmaster is stored.

Referring to FIG. 2, it starts with a master-slave hierarchy being negotiated in step 201 between the device and the master clock in the timing domain of the device. Such negotiations are performed at least in response to the device being started (switched on), in response to the device being connected to a network, and in response to the device detecting a change in its timing domain. When the master clock has been negotiated (selected), it is checked in step 202 whether or not the master clock is within limits. The limits are determined by the accuracy requirements of the device.

If the negotiated master is within time limits (step 202: yes), it is checked in step 203 whether or not the identifier of the negotiated master is in the grandmaster list of the device. In other words, it is checked whether the negotiated master is a primary grandmaster for the device. Naturally, if the device is started first time the list is empty.

If the negotiated master is in the grandmaster list (step 203: yes), in the illustrated example, as a precautionary measure, alarm and warning are reset in step 204, and it is determined in step 205 that the device is synchronized by the primary grandmaster. This means that in the example the synchronization status is set to be synchronized. By resetting alarm and warning ensures that in a monitoring system in the device, for example, there are no erroneous alarms or warnings. However, it should be appreciated that the resetting may be made conditionally, i.e. only if an alarm or warning has been set.

If the negotiated master is not in the grandmaster list (step 203: no), it is checked, in step 206, whether the negotiated master is better than the stored primary grandmaster. The checking may be performed using attributes values of the attributes stored to the grandmaster information with corresponding attribute values of the negotiated master to determine the best master order, using the same principles that are used in the device master-slave hierarchy negotiations.

If the negotiated master is not better than the primary grandmaster (step 206: no), it is determined in step 208 that the device is synchronized by one of the secondary grandmasters, and a warning is set. This means that in the example the synchronization status is set to be synchronized with warning. Setting the warning preferably causes that the monitoring system in the device is informed (indicated) correspondingly.

If the negotiated master is better (step 206: yes), the primary grandmaster in the list is replaced in step 207 by storing information of the negotiated master to the grandmaster list. Then the process proceeds to step 204 to reset warning and alarm.

If the negotiated master is not within limits (step 202: no), it is determined in step 209 that the device is not synchronized by a grandmaster, and an alarm is set. This means that in the example the synchronization status is set to be synchronized with alarm. Setting the alarm preferably causes that the monitoring system in the device is informed correspondingly In an implementation, using the adaptive way to maintain the grandmaster information, the grandmaster information is cleared (deleted) when the device is shut down or disconnected. In such an implementation the process may proceed, if the negotiated master is within limits (step 202: yes), directly to step 207 to store the negotiated master as the primary master to the grandmaster information, and then skips over resetting step 204 and proceeds to step 205 to determine that the device is synchronized by the primary grandmaster.

If the grandmaster information is maintained in a non-adaptive way, i.e. using a predefined grandmaster information, the above process may be performed so that if the negotiated master is within limits (step 202: yes), but not the primary in the list (step 203: no) the process proceeds directly to step 208 to determine that the device is synchronized by a secondary grandmaster and setting a warning. In other words, the process does not contain step 206 and 207.

In a still further examples, the checking step 202 is performed after step 206, before step 208, so that the process proceeds from step 202 to step 208 if the master is within limits, otherwise the process proceeds to step 209.

Figure 3:
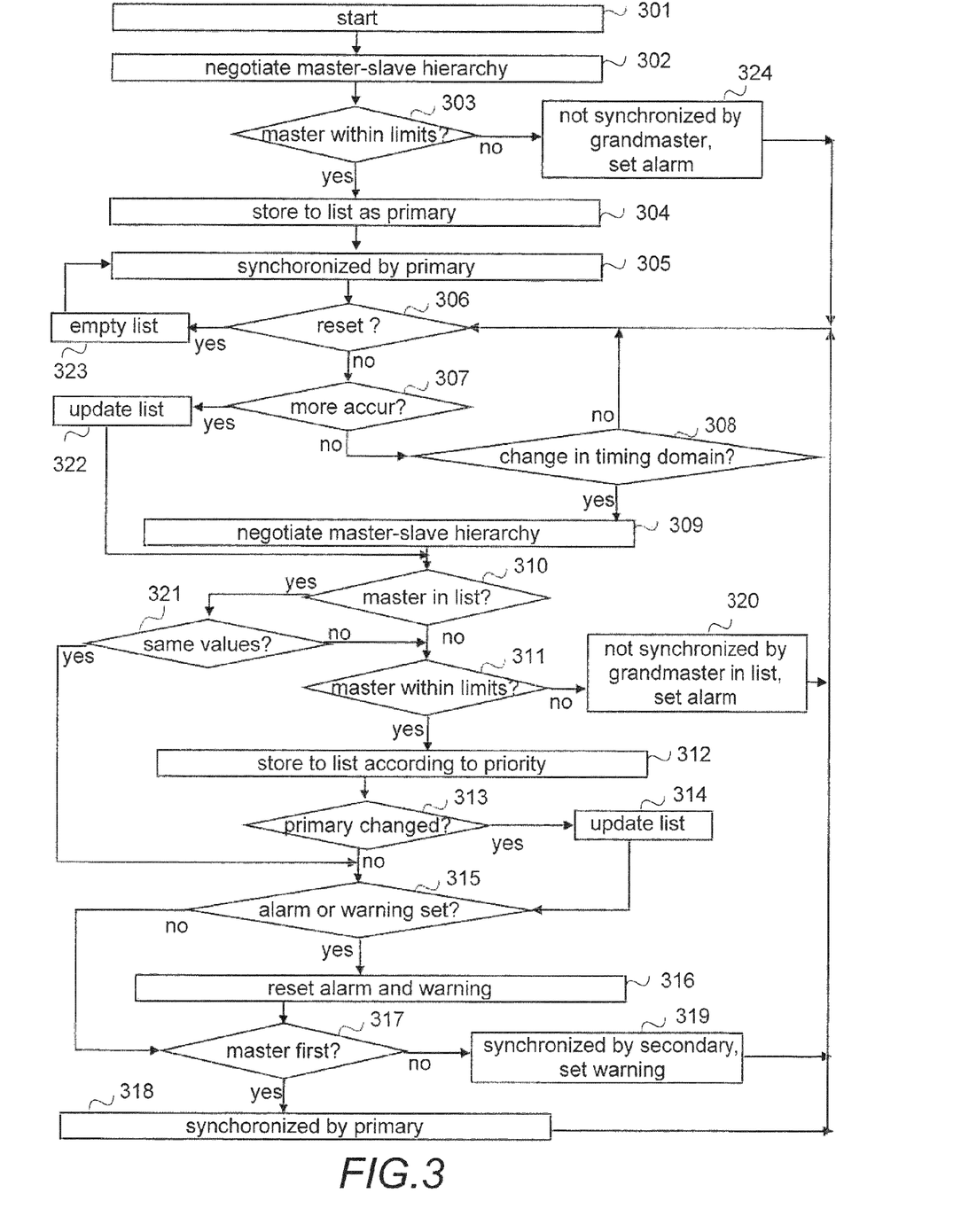

FIG. 3 illustrates another example of a functionality of the enhanced time supervision unit in a running device comprising the enhanced time supervision unit. In the illustrated example it is assumed that the grandmaster information is maintained in an adaptive way in an ordered list, called grandmaster list.

Referring to FIG. 3, when the device is started in step 301, a master-slave hierarchy is negotiated in step 302 between the device and the master clock in the timing domain of the device. When the master clock has been negotiated (selected), it is checked in step 303 whether or not the master clock is within limits. The limits are determined by the accuracy requirements of the device.

If the negotiated master is within time limits (step 303: yes), it is stored in step 304 to the grandmaster list as a primary grandmaster. Further, it is determined in step 305 that the device is synchronized by the primary grandmaster. This means that in the example the synchronization status is set to be synchronized.

As long as the device is on, it monitors settings and environment. In other words, in the illustrated example it is monitored, whether the device or the list is reset (step 306), or accuracy settings are updated to require a more accurate grandmaster (step 307), or whether a change in the timing domain is detected (step 308). For example, a new device may start to run in the timing domain, or a device providing the grandmaster clock may upgraded, downgraded, be shut down, or be disconnected, or for some other reason disappear. In other words, the timing domain of the device may change.

When a change in the timing domain is detected (step 308: yes), the device master-slave hierarchy is negotiated, or more precisely renegotiated, in step 309 between the device and a master clock in the timing domain of the device. When the master clock has been selected/negotiated, it is checked in step 310 whether or not the identifier of the negotiated master is in the grandmaster list of the device. In other words, it is checked whether the negotiated master is a new grandmaster for the device.

If the negotiated master is not in the grandmaster list (step 310: no), it is checked in step 311 whether or not the master clock is within limits. The limits are determined as described above with FIG. 2.

If the negotiated master is within time limits (step 311: yes), the new negotiated master is stored in step 312 to the grandmaster list according to its priority. For example, the attribute values of the attributes stored to the grandmaster information may be used with corresponding attribute values of the negotiated master to determine the best master order, using the same principles that are used in the device master-slave hierarchy negotiations. The comparison may be performed according to the priority order, one grandmaster at a time. Using the example illustrated in FIG. 1, an example how the best master order, or priority order, may be determined is given. First values for priority 1 are compared, and the one having the smaller value has the higher priority. If the values are the same, the clock qualities are compared, for example by comparing values of clock accuracies. The one having the smaller value has the higher priority. If the clock qualities are the same, then values for priority 2 are compared, and the one having the smaller value has the higher priority. If the values are the same, the priority order is determined by comparing the identity values of the identifiers and the one having the smaller value has the higher priority.

In the illustrated example it is further checked in step 313, whether the storing in step 312 results that the primary grandmaster was changed. If the new grandmaster was better than the previous primary (step 313: yes), the grandmaster list may further be updated in step 314. For example, if one of the accuracy requirements is that all secondary grandmasters have to have the same value for priority 1, the previous primary becoming the first secondary may cause that the other secondary grandmasters are taken from the grandmaster list, because they do not have the same value for priority 1.

After that, or if the primary grandmaster remained the same (step 313: no), it is checked in step 315, whether the previous negotiations set an alarm or a warning. If the alarm or warning was set (step 315: yes), the alarm and warning are reset in step 316. Naturally, if the monitoring system was indicated on the alarm or warning, a cancellation of the alarm or warning is preferably sent to the monitoring system.

Then it is checked in step 317, whether or not the negotiated master is the first one in the grandmaster list. If it is (step 317: yes), it is determined in step 318 that the device is synchronized by the primary grandmaster. This means that in the example the synchronization status is set to be synchronized. Then the process continues to monitor, whether the device or the list is reset (step 306), or accuracy settings are updated to require a more accurate grandmaster (step 307), or whether a change in the timing domain is detected (step 308).

If the state after previous negotiations is not alarm or warning (step 315: no), the process proceeds directly to step 317 to check whether or not the negotiated master is the first one in the grandmaster list.

If the negotiated master is not the first in the grandmaster list (step 317: no), it is determined in step 319 that the device is synchronized by one of the secondary grandmasters, and a warning is set. This means that in the example the synchronization status is set to be synchronized with warning. The warning is preferably indicated to the monitoring system. Then the process continues to monitor, whether the device or the list is reset (step 306), or accuracy settings are updated to require a more accurate grandmaster (step 307), or whether a change in the timing domain is detected (step 308).

If the negotiated master is not within limits (step 311: no), it is determined in step 320 that the device is not synchronized by a grandmaster in the list, i.e. by a grandmaster within accuracy requirements, and an alarm is set. This means that in the example the synchronization status is set to be synchronized with alarm. The alarm is preferably indicated to the monitoring system. Then the process continues to monitor, whether the device or the list is reset (step 306), or accuracy settings are updated to require a more accurate grandmaster (step 307), or whether a change in the timing domain is detected (step 308).

If the negotiated master is in the grandmaster list (step 310: yes), in the illustrated example it is checked in step 321, whether or not the attribute values used in the negotiations are the same as those in the grandmaster list. By this check the changes to clocks already in the list will be taken into account. For example, an antenna in a secondary grandmaster may be fixed during maintenance, or an antenna in the primary grandmaster may fail, both affecting to the attribute values. If the values are not the same (step 321: no), the process proceeds to step 311 to check whether the changed values are still within the limits. If the values are the same (step 321: yes), the process proceeds to step 315 to check whether an alarm or warning is set.

If the accuracy requirements of the device are updated to be more accurate (step 307: yes), the grandmaster list is updated in step 322 by removing from the list those grandmasters that do not fulfill the new accuracy requirements, i.e.

are not within new limits. Then the process proceeds to step 310 to check whether the current master is still in the grandmaster list.

In the illustrated example no values for attributes, for example, are stored on a master clock that was not within the previous limits (check in step 303 and 310). Therefore, in the illustrated example, if the accuracy requirements are updated to be less accurate, there is no need to update the list—all in the list will fulfill the requirements. However, in an implementation in which information also on a current master clock that is not in the grandmaster list may be stored temporarily, less accurate accuracy requirements may be mapped against the temporarily stored information. If the master clock is within the less strict limits, the master clock may be stored to the grandmaster list.

If the list is reset (step 306), the grandmaster list is emptied in step 323 and in the illustrated example it is assumed that the current grandmaster is the primary and the process proceeds to step 305 to determine that the device is synchronized by the primary grandmaster. However, if the device is reset, the process proceeds from step 323 to step 302 to negotiate the master-slave hierarchy (not illustrated in FIG. 3). Naturally in another implementation the list reset may also trigger master-slave hierarchy negotiations. It should be appreciated that resetting the list or device also reset warning and alarms if they have been previously set. By providing a user a possibility to reset the list enables the user to "force" the device to relearn clocks in the timing domain after maintenance, for example.

If the first negotiated master clock, or the first negotiated master clock after the grandmaster list have been emptied, is not within limits (step 303: no), it is determined in step 324 that the device is not synchronized by a grandmaster, and an alarm is set. This means that in the example the synchronization status is set to be synchronized with alarm. Setting the alarm preferably causes that the monitoring system in the device is informed correspondingly. Then the process starts to monitor, whether the device or the list is reset (step 306), or accuracy settings are updated to require a more accurate grandmaster (step 307), or whether a change in the timing domain is detected (step 308).

Figure 4:
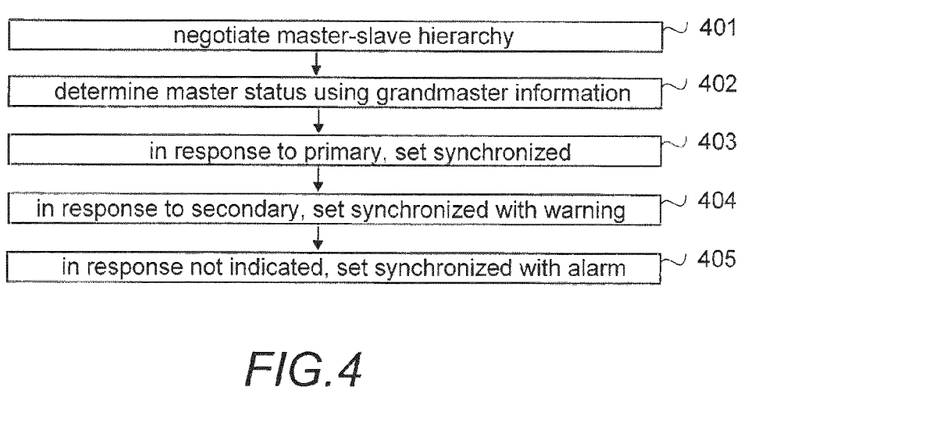

FIG. 4 illustrates a further example of a functionality of the enhanced time supervision unit. In the illustrated example the grandmaster information is predefined grandmaster information. For one skilled in the art, implementing the functionality using an adaptive way to maintain the grandmaster information is a straightforward solution: one performs adding a new accurate enough grandmaster to the grandmaster information, using the principles described above.

Referring to FIG. 4, when the master-slave hierarchy is negotiated, or renegotiated, in step 401, the master status is determined in step 402 using the grandmaster information. For example, using the clock identifier of the negotiated master clock, one can determine from the grandmaster information the grandmaster type of the negotiated clock. In response to the negotiated master clock being indicated in the grandmaster information as the primary grandmaster, the device is set in step 403 to be synchronized. In response to the negotiated master clock being indicated in the grandmaster information as one of the secondary grandmasters, the device is set in step 404 to be synchronized with warning. In response to the negotiated master clock not being in the grandmaster information, the device is set in step 405 to synchronized with alarm.

Figure 5:
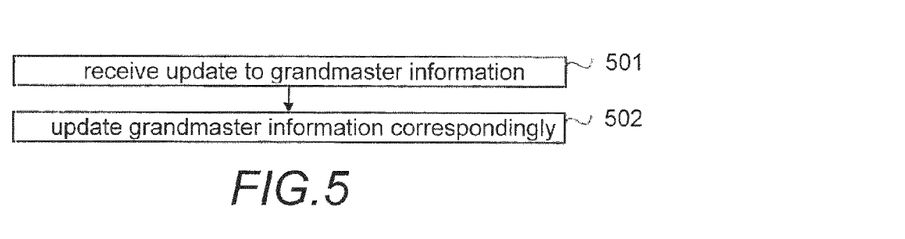

FIG. 5 illustrates a further example of a functionality of the enhanced time supervision unit according the grandmaster information is maintained in a non-adaptive way, i.e. is predefined.

Referring to FIG. 5, when an update to the grandmaster information is received in step 501, the grandmaster information maintained in the memory is updated in step 502 correspondingly. Examples of what may trigger updating the predefined grandmaster information include replacing during maintenance the primary grandmaster clock, or one of the secondary grandmaster clocks, or adding to the network a better clock than the current primary grandmaster clock.

As can be seen from the above, a mechanism enabling to detect that a primary time source reference is lost and a transition to a secondary time source reference has taken place, and to detect also a loss of the secondary time source reference is provided. For example, supervision of timing will be improved by having the three types of grandmasters. That in turn reduces troubleshooting efforts for example in sub-station automation networks. The adaptive grandmaster information requires no additional configuration compared to the predefined grandmaster information. However, the configuration required by the predefined grandmaster information is rather easy to update.

The steps and related functions described above in FIGS. 2, 3, 4 and/or 5 are in no absolute chronological order, and some of the steps may be performed simultaneously or in an order differing from the given one. Other functions can also be executed between the steps or within the steps, and other information may be sent. For example, each time it is detected that the change in the time domain is caused by the clock to which the device is synchronized disappearing from the timing domain, a warning may be set as a precaution before starting the negotiations. Another example is that before emptying an adaptive ordered list, a copy of it is sent to a history log. Some of the steps or part of the steps can also be left out or replaced by a corresponding step or part of the step. For example, instead of alarm, warning may be set if the negotiated master clock is an internal clock of the device. In other examples, based on the example of FIG. 3, one or more of steps 306, 307, 313, 314, 321, 322 and 323 may be left out.

The techniques and methods described herein may be implemented by various means so that a device/an apparatus configured to support best master clock negotiations on at least partly on what is disclosed above with any of FIGS. 1 to 5, including implementing one or more functions/operations of a corresponding device described above with an embodiment/example, for example by means of any of FIGS. 2 to 5, comprises not only prior art means, but also means for implementing the one or more functions/operations of a corresponding functionality described with an embodiment/example, for example by means of any of FIGS. 2 to 5, and the device may comprise separate means for each separate function/operation, or means may be configured to perform two or more functions/operations. For example, one or more of the means and/or the enhanced time supervision unit described above may be implemented in hardware (one or more devices), firmware (one or more devices), software (one or more modules), or combinations thereof. For a hardware implementation, the device (s) or apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 2 to 5, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 6:
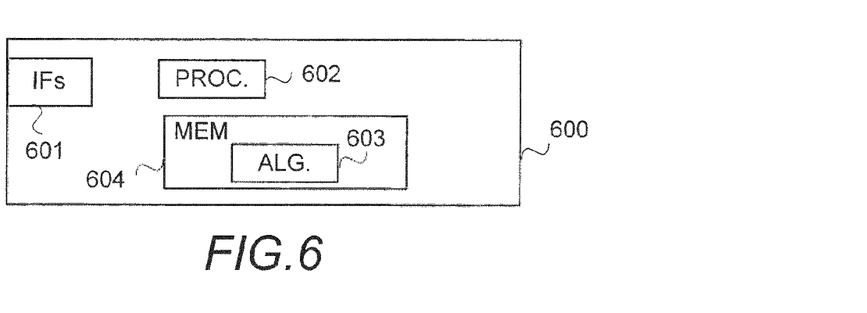
FIG. 6 is a schematic block diagram.

FIG. 6 provides an apparatus according to some embodiments of the invention. FIG. 6 illustrates an apparatus configured to carry out the functions described above in connection with the device. Each apparatus 600 may comprise one or more communication control circuitry, such as at least one processor 602, and at least one memory 604, including one or more algorithms 603, such as a computer program code (software) wherein the at least one memory and the computer program code (software) are configured, with the at least one processor, to cause the apparatus to carry out any one of the exemplified functionalities of the device. The apparatus may further comprise different communication interfaces 601 and one or more user interfaces (not separately illustrated).

Referring to FIG. 6, at least one of the communication control circuitries in the apparatus 600 is configured to provide the enhanced time supervision unit, or any corresponding sub-unit, and to carry out functionalities, described above by means of any of FIGS. 2 to 5, by one or more circuitries.

The memory 604 or part of it may be implemented using any suitable data storage technology, such as semiconductor based memory devices, flash memory, magnetic memory devices and systems, optical memory devices and systems, fixed memory and removable memory.

The one or more communication interfaces 601 may comprise hardware and/or software for realizing communication connectivity according to one or more communication protocols. The communication interface may provide the apparatus with communication capabilities to communicate over a local connection and/or local connections and/or in a cellular communication system and/or in a fixed network, and enable communication between different apparatuses. The communication interface 601 may comprise standard well-known components.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a micro-processor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a user apparatus or a similar integrated circuit in a device.

In an embodiment, the at least one processor, the memory, and the computer program code form processing means or comprises one or more computer program code portions for carrying out one or more operations according to any one of the embodiments of FIGS. 2 to 5 or operations thereof.

Embodiments as described may also be carried out in the form of a computer process defined by a computer program or portions thereof. Embodiments of the methods described in connection with FIGS. 2 to 5 may be carried out by executing at least one portion of a computer program comprising corresponding instructions. The computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   maintaining, in a device, grandmaster information, which comprises information on a primary grandmaster and information based on which one or more secondary grandmasters are determinable, wherein each of the primary grandmaster and the one or more secondary grandmasters is, within a timing domain of the device, an external clock usable for synchronizing the device;
   performing by the device master-slave hierarchy negotiations during which a master clock is negotiated;
   using, by the device, after the negotiations, the grandmaster information to determine whether a type of the master clock negotiated is the primary grandmaster, a secondary grandmaster, or neither;
   setting, by the device, in response to the type being the primary grandmaster, a synchronisation status of the device to be synchronized;
   setting, by the device, in response to the type being the secondary grandmaster, the synchronisation status of the device to be synchronized with warning; and
   setting, by the device, in response to the type being neither, the synchronisation status of the device to synchronized with alarm.

2. The method of claim 1, wherein
   the information on the primary grandmaster comprises at least a clock identifier; and the information based on which one or more secondary grandmasters are determinable comprises for each secondary grandmaster at least a clock identifier.

3. The method of claim 1, wherein the grandmaster information comprises further for each grandmaster in the grandmaster information at least attribute values for attributes that are usable in the device master-slave hierarchy negotiations to determine the best block.

4. The method of claim 3, wherein the using the grandmaster information to determine a type of the master clock negotiated comprises:
checking, whether the master clock negotiated is in the grandmaster information;
if the master clock negotiated is in the grandmaster information, determining whether the master clock negotiated is the primary grandmaster or one of the secondary grandmasters;
if the master clock negotiated is not in the grandmaster information, performing further the following:
checking, whether or not the master clock negotiated fulfils requirements set to timing accuracy;
if the requirements are not fulfilled, determining that the master clock negotiated is not the primary grandmaster or any of the secondary grandmasters;
if the requirements are fulfilled, using attribute values of the master clock negotiated and attribute values in the grandmaster information to determine whether the master clock negotiated will be the primary grandmaster or one of the secondary grandmasters, and updating the grandmaster information correspondingly.

5. The method of claim 1, further comprising:
receiving an update to the grandmaster information; and
updating the grandmaster information correspondingly.

6. The method of claim 1, wherein
the information on the primary grandmaster comprises at least a clock identifier; and
the information based on which one or more secondary grandmasters are determinable comprises requirements set to timing accuracy, and a master clock negotiated that is not the primary grandmaster but fulfils the requirements is determined to be a secondary grandmaster.

7. The method of claim 1, wherein the grandmaster information comprises further for the primary grandmaster at least attribute values for attributes that are usable in the device master-slave hierarchy negotiations to determine the best clock; and
if the master clock negotiated is not the primary grandmaster but fulfils the requirements determining, using the attribute values of the master clock negotiated and the primary grandmaster, which one is the best clock; and
if the master clock negotiated is determined to be the best clock updating the grandmaster information corresponding, and using the updated grandmaster information to determine a type of the master clock negotiated.

8. A device comprising at least one processor, at least one memory including computer program code, and at least one interface, wherein the at least one memory and the computer program code are configured to, with the at least one processor, cause the device to:
maintain, in the device, grandmaster information, which comprises information on a primary grandmaster and information based on which one or more secondary grandmasters are determinable, wherein each of the primary grandmaster and the one or more secondary grandmasters is, within a timing domain of the device, an external clock usable for synchronizing the device;
perform master-slave hierarchy negotiations during which a master clock is negotiated;
use after the negotiations, the grandmaster information to determine whether a type of the master clock negotiated is the primary grandmaster, a secondary grandmaster, or neither;
set in response to the type being the primary grandmaster, a synchronisation status of the device to synchronized;
set in response to the type being the secondary grandmaster, the synchronisation status of the device to synchronized with warning; and
set in response to the type being neither, the synchronisation status of the device to synchronized with alarm.

9. The device of claim 8, wherein the at least one memory and the computer program code are configured to, with the at least one processor, further cause the device when using the grandmaster information to determine the type of the master clock negotiated to:
check, whether the master clock negotiated is in the grandmaster information;
if the master clock negotiated is in the grandmaster information, determine whether the master clock negotiated is the primary grandmaster or one of the secondary grandmasters;
if the master clock negotiated is not in the grandmaster information, perform further the following:
check, whether or not the master clock negotiated fulfils requirements set to timing accuracy;
if the requirements are not fulfilled, determine that the master clock negotiated is not the primary grandmaster or any of the secondary grandmasters;
if the requirements are fulfilled, use attribute values of the master clock negotiated and attribute values in the grandmaster information to determine whether the master clock negotiated will be the primary grandmaster or one of the secondary grandmasters, and update the grandmaster information correspondingly.

10. The device of claim 8, wherein the at least one memory and the computer program code are configured to, with the at least one processor, further cause the device to:
update, in response to receiving an update to the grandmaster information, the grandmaster information correspondingly.

11. The device of claim 8, wherein the at least one memory and the computer program code are configured to, with the at least one processor, further cause the device to determine whether the master clock negotiated is the primary grandmaster or one of the secondary grandmasters by using clock identifiers in the grandmaster information.

12. The device of claim 8, wherein the at least one memory and the computer program code are configured to, with the at least one processor, further cause the device to use attribute values for attributes in the grandmaster information to determine the best clock in the master-slave hierarchy negotiations.

13. The device of claim 8, wherein the at least one memory and the computer program code are configured to, with the at least one processor, further cause the device to:
maintain in the information on the primary grandmaster at least a clock identifier and in the information based on which one or more secondary grandmasters are determinable requirements set to timing accuracy; and
determine that the master clock that is not the primary grandmaster but fulfills the requirements is a secondary grandmaster.

14. A computer program product comprising a non-transitory computer readable storage medium having program instructions embodied therewith, the program instructions executable by a device to cause the device to:

maintain, in the device, grandmaster information, which comprises information on a primary grandmaster and information based on which one or more secondary grandmasters are determinable, wherein each of the primary grandmaster and the one or more secondary grandmasters is, within a timing domain of the device, an external clock usable for synchronizing the device;

perform master-slave hierarchy negotiations during which a master clock is negotiated;

use after the negotiations, the grandmaster information to determine whether a type of the master clock negotiated is the primary grandmaster, a secondary grandmaster, or neither;

set in response to the type being the primary grandmaster, a synchronisation status of the device to synchronized;

set in response to the type being the secondary grandmaster, the synchronisation status of the device to synchronized with warning; and set in response to the type being neither, the synchronisation status of the device to synchronized with alarm.

15. The computer program product of claim 14, wherein the information on a primary grandmaster comprises at least a clock identifier; and the information based on which one or more secondary grandmasters are determinable comprises for each secondary grandmaster at least a clock identifier.

16. The computer program product of claim 14, wherein the grandmaster information comprises further for each grandmaster in the grandmaster information at least attribute values for attributes that are usable in the device master-slave hierarchy negotiations to determine the best clock.

17. The computer program product of claim 14, wherein the information on a primary grandmaster comprises at least a clock identifier; and the information based on which one or more secondary grandmasters are determinable comprises requirements set to timing accuracy, and a master clock negotiated that is not the primary grandmaster but fulfils the requirements is determined to be a secondary grandmaster.

* * * * *